(12) United States Patent
Yamashita et al.

(10) Patent No.: US 10,652,157 B2
(45) Date of Patent: May 12, 2020

(54) SYSTEMS AND METHODS OF RECEIVING INFORMATIONAL CONTENT BASED ON TRANSMITTED APPLICATION INFORMATION

(71) Applicant: NINTENDO CO., LTD., Kyoto (JP)

(72) Inventors: Yoshikazu Yamashita, Kyoto (JP); Yoji Kamikawa, Kyoto (JP); Takashi Hosoi, Kyoto (JP); Yusuke Inoue, Kyoto (JP); Masahiro Yoshino, Kyoto (JP); Shinpei Kiwada, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 188 days.

(21) Appl. No.: 15/840,266

(22) Filed: Dec. 13, 2017

(65) Prior Publication Data
US 2018/0367628 A1    Dec. 20, 2018

(30) Foreign Application Priority Data
Jun. 19, 2017 (JP) .................................. 2017-119428

(51) Int. Cl.
*H04L 12/859* (2013.01)
*H04L 29/08* (2006.01)
(Continued)

(52) U.S. Cl.
CPC .......... *H04L 47/2475* (2013.01); *H04L 47/24* (2013.01); *H04L 63/102* (2013.01);
(Continued)

(58) Field of Classification Search
CPC ... H04L 47/2475; H04L 65/40; H04L 63/102; H04L 65/60; H04L 65/1073; H04L 47/24; H04L 67/26; H04L 67/30
See application file for complete search history.

(56) References Cited

U.S. PATENT DOCUMENTS 8,612,612 B1 * 12/2013 Dukes ..................... H04L 67/14
370/230
10,120,606 B2 * 11/2018 Kim ........................ G06F 3/061
(Continued)

FOREIGN PATENT DOCUMENTS

JP          2005-242758          9/2005
JP          2019003532 A *  1/2019 ............. H04L 67/30

*Primary Examiner* — Ramy M Osman
(74) *Attorney, Agent, or Firm* — Nixon & Vanderhye P.C.

(57) ABSTRACT

An example of an information processing system includes an information processing terminal and a server configured to communicate with the information processing terminal. The information processing terminal starts an application in accordance with an instruction of a user and transmits identification information of the started application to the server. The server stores specifying information for specifying, from among a plurality of contents, a content or a group of contents as a target to be transmitted to the information processing terminal, in association with identification information of an application. The server receives identification information from the information processing terminal and selects, from the stored specifying information, specifying information associated with the identification information received from the information processing terminal. The information processing system registers a content or a group of contents specified by the selected specifying information, as a target to be transmitted to the information processing terminal.

15 Claims, 12 Drawing Sheets

(51) Int. Cl.
*H04L 12/851* (2013.01)
*H04L 29/06* (2006.01)

(52) U.S. Cl.
CPC .......... *H04L 65/1073* (2013.01); *H04L 65/40* (2013.01); *H04L 65/60* (2013.01); *H04L 67/26* (2013.01); *H04L 67/30* (2013.01)

(56) References Cited

U.S. PATENT DOCUMENTS

| | | | |
|---|---|---|---|
| 2001/0052012 A1* | 12/2001 | Rinne | H04L 47/2475 709/224 |
| 2003/0218765 A1* | 11/2003 | Ohishi | G06F 9/50 358/1.13 |
| 2004/0257994 A1* | 12/2004 | Paskett | H04L 47/10 370/230 |
| 2005/0144032 A1* | 6/2005 | Shimoda | G06Q 30/06 705/26.1 |
| 2006/0002317 A1* | 1/2006 | Punaganti Venkata | H04M 3/4872 370/310 |
| 2008/0106597 A1* | 5/2008 | Amini | H04N 7/181 348/143 |
| 2009/0292824 A1* | 11/2009 | Marashi | H04L 67/101 709/247 |
| 2011/0185052 A1* | 7/2011 | Nakahira | H04L 47/2475 709/223 |
| 2011/0313916 A1* | 12/2011 | Niven-Jenkins | G06Q 20/10 705/39 |
| 2013/0054698 A1* | 2/2013 | Lee | H04W 4/023 709/204 |
| 2013/0238472 A1* | 9/2013 | Fan | G06Q 30/04 705/34 |
| 2014/0094195 A1* | 4/2014 | Luo | H04W 4/12 455/456.6 |
| 2014/0169172 A1* | 6/2014 | Hu | H04L 67/02 370/236 |
| 2014/0325057 A1* | 10/2014 | Borawski | H04L 67/22 709/224 |
| 2016/0203519 A1* | 7/2016 | Ketchpaw | G06Q 30/0267 705/14.64 |
| 2017/0244866 A1* | 8/2017 | Kano | G06F 3/1239 |
| 2017/0351872 A1* | 12/2017 | Wu | G06F 3/0481 |
| 2018/0032521 A1* | 2/2018 | Boerschinger | G06F 16/313 |
| 2018/0359612 A1* | 12/2018 | Buckley | H04W 4/06 |
| 2018/0367628 A1* | 12/2018 | Yamashita | H04L 67/26 |

* cited by examiner

Fig.5

| APP IDENTIFICATION INFORMATION ||  CHANNEL SPECIFYING INFORMATION |
|---|---|---|
| APPLICATION | COUNTRY/LANGUAGE | |
| APPLICATION A | JAPAN/JAPANESE | APP A CHANNEL |
| APPLICATION B | JAPAN/JAPANESE | APP B CHANNEL |
| | | DEVELOPMENT MANUFACTURER X CHANNEL |
| APPLICATION C | ENGLISH-SPEAKING WORLD/ENGLISH | APP C CHANNEL |
| ⋮ | ⋮ | ⋮ |

SYSTEMS AND METHODS OF RECEIVING INFORMATIONAL CONTENT BASED ON TRANSMITTED APPLICATION INFORMATION

CROSS REFERENCE TO RELATED APPLICATION

The disclosure of Japanese Patent Application No. 2017-119428, filed on Jun. 19, 2017, is incorporated herein by reference.

FIELD

The technology relates to an information processing system for transmitting a content from a server to an information processing terminal.

BACKGROUND AND SUMMARY

Conventionally, there is a distribution system for distributing news to a user. For example, there is a system for recording in advance an article distributed to a user and distributing to the user a related article related to the distributed article.

Conventionally, there is a case where it is not possible to distribute a content (e.g., news) desired by a user to an information processing terminal of the user. For example, there is a case where it is not possible to provide news corresponding to an application used by a user in an information processing terminal of the user for the user.

Therefore, the present application discloses an information processing system, an information processing apparatus, a storage medium having stored therein an information processing program, and an information processing method that are capable of providing a content corresponding to an application to be used by a user for the user.

(1)

An example of an information processing system according to the present specification includes an information processing terminal and a server configured to communicate with the information processing terminal.

The information processing terminal includes: one or more processors; and a first transceiver.

The one or more processors of the information processing terminal are configured to: start an application in accordance with an instruction of a user; and transmit identification information of the started application to the server, using the first transceiver.

The server includes: one or more processors; a memory; and a second transceiver. The memory of the server is configured to store specifying information in association with identification information of an application, wherein the specifying information specifies, from among a plurality of contents, a content or a group of contents as a target to be transmitted to the information processing terminal. The one or more processors of the server are configured to: receive identification information from the information processing terminal, using the second transceiver; and select, from among the specifying information stored in the memory, specifying information associated with the identification information received from the information processing terminal.

The one or more processors of the information processing terminal or the server are configured to register a content or a group of contents specified by the selected specifying information, as a target to be transmitted to the information processing terminal regarding the information processing terminal.

According to the above configuration (1), it is possible to register a content (or a group of contents) corresponding to an application started in accordance with an instruction of a user in an information processing terminal. Consequently, a server can provide a content corresponding to an application to be used by the user for the user. Further, the user does not need to give an instruction to register an application separately from an instruction to start the application. Thus, it is possible to reduce the trouble of the user regarding registration.

(2)

Every time an application is started in the information processing terminal, the one or more processors of the information processing terminal may transmit identification information of the application to the server.

According to the above configuration (2), every time an application is used in an information processing terminal, an information processing system can register a content (or a group of contents). Thus, even when the association between identification information and specifying information is changed on the server side, it is possible to execute a registration process based on the changed association at an appropriate timing.

(3)

When an application is started multiple times in the information processing terminal, then in accordance with at least twice or more starts among the starts made multiple times, the one or more processors of the information processing terminal may transmit identification information of the application to the server.

(4)

Regardless of whether or not specifying information is selected in accordance with a start of the application, and under the condition that a user gives a registration instruction, the one or more processors of the information processing terminal or the server may register a content or a group of contents.

According to the above configuration (4), also in a case other than a case where an application is started, it is possible to perform registration in accordance with a registration instruction given by the user. Thus, it is easy for the user to perform registration. Thus, it is possible to improve convenience for the user.

(5)

The one or more processors of the information processing terminal may be further configured to cancel the registration of the content or the group that has already been registered.

According to the above configuration (5), the information processing terminal can cancel registration. Thus, for example, it is possible to cancel the registration of a content (or a group of contents) that the user does not wish to register. Consequently, it is possible to reduce the possibility that an unnecessary content is transmitted from the server to the information processing terminal. Thus, it is possible to reduce the amount of communication.

(6)

Under the condition that registration of a content or a group of contents specified by the selected specifying information has not previously been canceled, the one or more processors of the information processing terminal or the server may register the content or the group of contents.

According to the above configuration (6), an information processing system does not register a content (or a group of contents) of which the registration has previously been canceled, even if the content or the group of contents is selected by specifying information selection means. According to this, it is possible to reduce the possibility that a content (or a group of contents) is registered against the intention of the user.

(7)

In a case where the information processing terminal is in a state where the information processing terminal cannot communicate with the server when the application is started, the one or more processors of the information processing terminal may transmit the identification information to the server after the information processing terminal becomes able to communicate with the server.

According to the above configuration (7), even in a case where the information processing terminal cannot communicate with the server when an application is started, the information processing terminal can transmit identification information to the server.

(8)

The one or more processors of the server may be further configured to transmit the selected specifying information to the information processing terminal, using the first transceiver. The one or more processors of the information processing terminal may be further configured to receive the specifying information from the server, using the second transceiver. The one or more processors of the information processing terminal may register a content or a group of contents specified by the specifying information received from the server.

According to the above configuration (8), even in a state where the information processing terminal cannot communicate with the server when a registered content is changed, the information processing terminal can reflect the change at this time.

(9)

While a started application is being executed, the one or more processors of the information processing terminal may execute in a background a process of registering a content or a group of contents specified by specifying information associated with identification information of the application.

According to the above configuration (9), after an application is started, the information processing terminal can execute a registration process soon.

(10)

Regarding at least several pieces of identification information of a plurality of types of identification information, the memory of the server may store a plurality of pieces of specifying information in association with a single piece of identification information. When a plurality of pieces of specifying information are associated with identification information received from the information processing terminal, the one or more processors of the server may select each of the plurality of pieces of specifying information.

According to the above configuration (10), in accordance with the start of an application made once, the information processing system can register a plurality of contents (or a plurality of groups of contents). This can further improve convenience for the user.

(11)

The one or more processors of the information processing terminal may: start a game application; and transmit identification information of the started game application to the server.

According to the above configuration (11), an information processing system can register a content (or a group of contents) in accordance with the start of a game application.

(12)

The one or more processors of the server may be further configured to, under the condition that a content is a registered content or a content included in a registered group, transmit the content among the plurality of contents to the information processing terminal, using the second transceiver. The one or more processors of the information processing terminal may be further configured to: receive the content from the server, using the first transceiver; and display on a display the content received from the server.

According to the above configuration (12), the server can provide a content regarding registration for the information processing terminal, and the information processing terminal can present the provided content for the user.

It should be noted that the present specification discloses an example of the information processing terminal or the server in the above (1) to (12). Further, the present specification discloses an example of a storage medium having stored therein an information processing program for causing a computer of an information processing terminal (or a server) to function as means of the information processing terminal (or the server) in the above (1) to (12). Further, the present specification discloses an example of an information processing method executed by the information processing system in the above (1) to (12).

According to the information processing system, the information processing apparatus, the storage medium having stored therein the information processing program, or the information processing method, it is possible to provide a content corresponding to an application to be used by a user for the user.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 5 is a diagram showing a non-limiting example of a registration rule table;

DETAILED DESCRIPTION OF NON-LIMITING EXAMPLE EMBODIMENTS

[1. Overall Configuration of System]

Figure 1:
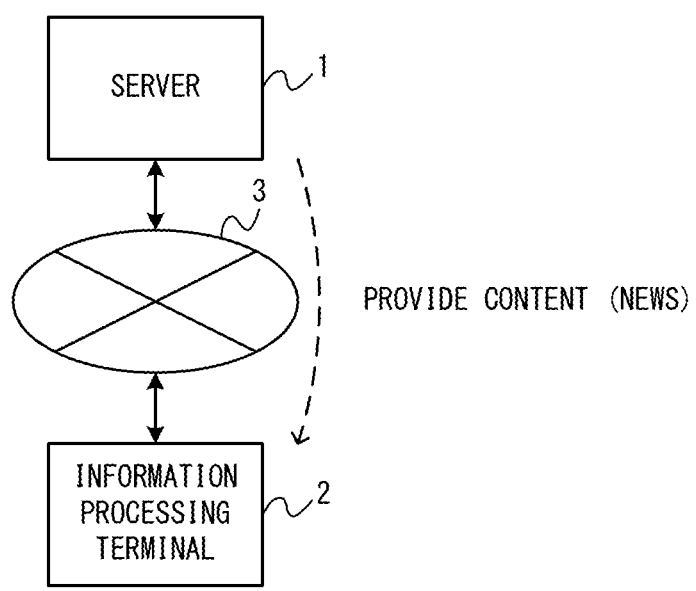
FIG. 1 is a block diagram showing a non-limiting example of the configuration of an information processing system according to an exemplary embodiment.

A description is given below of an information processing system, an information processing apparatus, a storage medium having stored therein an information processing program, and an information processing method according to an exemplary embodiment. First, a description is given of the overall configuration of the information processing system according to the exemplary embodiment and the configurations of an information processing terminal and a server included in the information processing system. FIG. 1 is a block diagram showing an example of the configuration of the information processing system according to the exemplary embodiment. As shown in FIG. 1, the information processing system includes a server 1 and an information processing terminal 2. The server 1 and the information processing terminal 2 can connect to a network 3 such as the Internet and/or a mobile communication network. The server 1 and the information processing terminal 2 can communicate with each other via the network 3. It should be noted that although FIG. 1 shows a single information processing terminal 2, the information processing system may include a plurality of information processing terminals.

The server 1 according to the exemplary embodiment provides a news content for the information processing terminal 2 (see FIG. 1). It should be noted that the content provided for the information processing terminal 2 is any content. In another exemplary embodiment, the content may be a moving image, a still image, an application, and/or the like.

Here, in the exemplary embodiment, news provided for the information processing terminal 2 is managed by classifying the news into groups termed news channels. A user of the information processing terminal 2 registers the news channel of news to be provided for the information processing terminal 2. Consequently, news belonging to the registered news channel is provided for the information processing terminal 2. In the exemplary embodiment, the server 1 manages the registration of a news channel regarding the information processing terminal 2 (the details will be described later). In the exemplary embodiment, news provided for the information processing terminal 2 is managed on a news-channel-by-news-channel basis. In another exemplary embodiment, news provided for the information processing terminal 2 may be managed on a news-by-news basis (see "[4. Operation and Effect and Variations of Exemplary Embodiment]" described later).

The information processing terminal 2 is an example of the information processing apparatus owned by a user and is, for example, a smartphone, a mobile or stationary game apparatus, a mobile phone, a tablet terminal, a wearable terminal, a personal computer, or the like. The information processing terminal 2 can execute various applications. In the exemplary embodiment, the information processing terminal 2 can execute at least one game application. Further, the information processing terminal 2 receives, from the server 1, data of news provided for the information processing terminal 2 itself and presents the news to the user at an appropriate timing.

(Specific Example of Configuration of Server 1)

Figure 2:
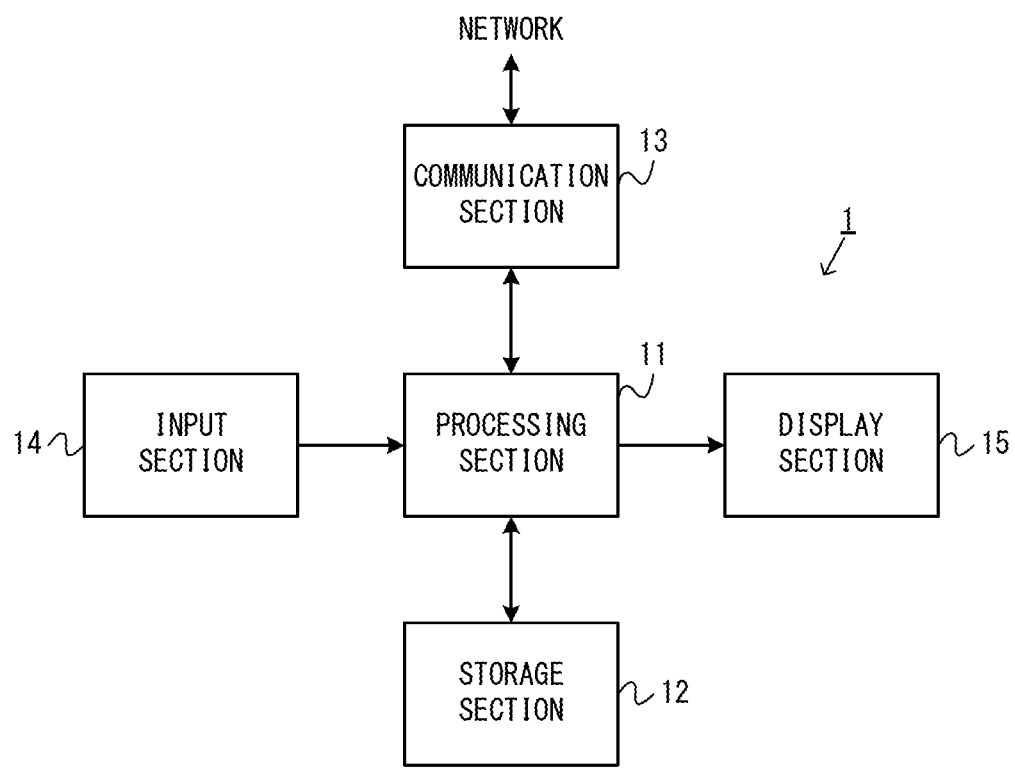
FIG. 2 is a block diagram showing a non-limiting example of the configuration of a server.

FIG. 2 is a block diagram showing an example of the configuration of the server 1. Components shown in FIG. 2 and included in the server 1 are achieved by one or more information processing apparatuses. Here, in the present specification, a "server" refers to a single information processing apparatus (i.e., a server apparatus), and when the function of the server is achieved by a plurality of server apparatuses, also refers to the entirety of a server apparatus group (i.e., a server system). That is, a "server" may be a server apparatus, or may be a server system. It should be noted that when a plurality of information processing apparatuses are included in the server system, the information processing apparatuses may be placed in the same place, or may be placed in different places. For example, in the exemplary embodiment, when the server 1 includes an information processing apparatus for transmitting data of news to the information processing terminal 2, and an information processing apparatus for managing the registration of a news channel, these two information processing apparatuses may be placed in different places. It should be noted that the hardware configuration of the server 1 according to the exemplary embodiment may be similar to the hardware configuration of a conventional server.

As shown in FIG. 2, the server 1 includes a processing section 11 and a storage section 12. The processing section 11 is electrically connected to components 12 to 15 of the server 1. The processing section 11 includes a CPU (Central Processing Unit) and a memory. In the server 1, the CPU executes a program stored in the storage section 12, using the memory, thereby executing various types of information processing. The storage section 12 is any storage device (also referred to as "storage medium") accessible by the processing section 11. The storage section 12 stores a program to be executed by the processing section 11, data to be used in information processing performed by the processing section 11, data obtained by the information processing, and the like. In the exemplary embodiment, the storage section 12 at least stores a program (referred to as a "server-side program") for information processing to be executed on the server side to manage the registration of a news channel.

The server 1 includes a communication section 13. The communication section 13 has the function of connecting to the network 3 and communicating with another apparatus (e.g., the information processing terminal 2) via the network 3. The processing section 11 communicates with another apparatus via the network 3 using the communication section 13 (in other words, via the communication section 13). Further, the server 1 includes an input section 14 and a display section 15 as input/output interfaces. For example, when an update of a registration rule described later (FIG. 5) is present, a server administrator performs work for the update using the input/output interfaces.

(Specific Example of Configuration of Information Processing Terminal 2)

Figure 3:
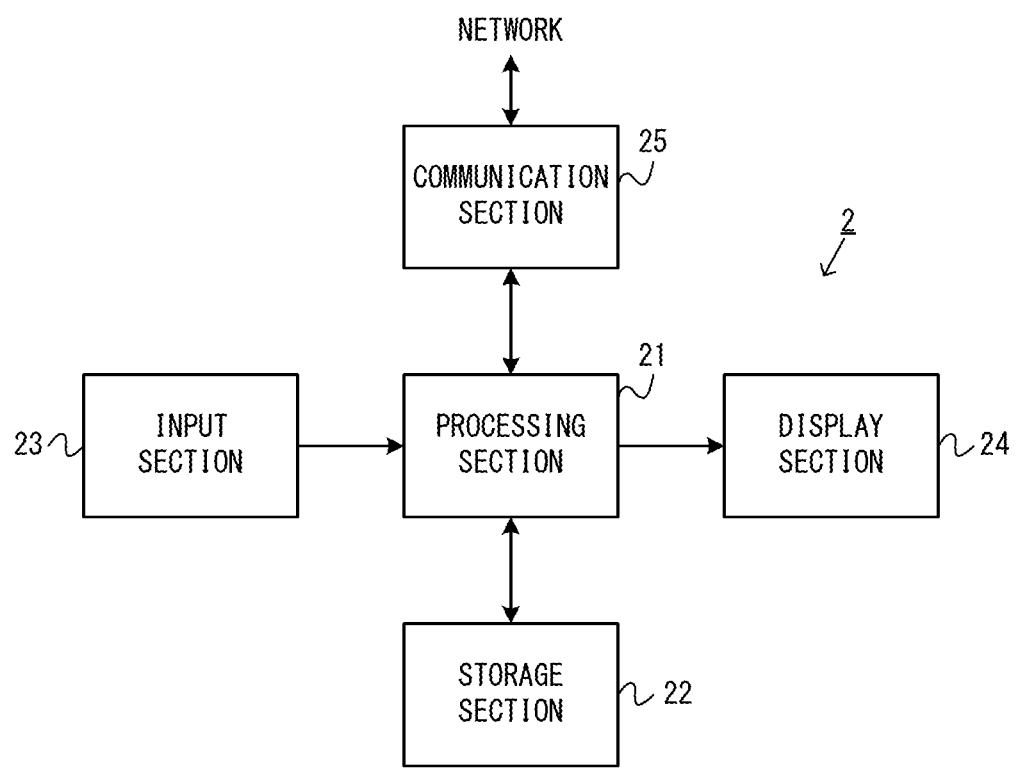
FIG. 3 is a block diagram showing a non-limiting example of the configuration of an information processing terminal.

FIG. 3 is a block diagram showing an example of the configuration of the information processing terminal 2. As shown in FIG. 3, the information processing terminal 2 includes a processing section 21 and a storage section 22. The processing section 21 is electrically connected to components 22 to 25 of the information processing terminal 2. The processing section 21 includes a CPU (Central Processing Unit) and a memory. In the information processing terminal 2, the CPU executes a program (including the above game application) stored in the storage section 22, using the memory, thereby executing various types of information processing. The storage section 22 stores a program to be executed by the processing section 21, data to be used in information processing performed by the processing section 21, data obtained by the information processing, and the like. The storage section 22 may be a storage medium built into the information processing terminal 2, or may be a storage medium attachable to and detachable from the information processing terminal 2.

The information processing terminal 2 includes an input section 23. The input section 23 may be any input device for receiving an input provided by the user. In the exemplary embodiment, the input section 23 includes a touch panel provided on a screen of a display section 24 described later. It should be noted that the input section 23 may include a button, an inertial sensor (e.g., an acceleration sensor or a gyro sensor), and/or the like in addition to (or instead of) the touch panel.

The information processing terminal 2 includes a display section 24. The display section 24 displays an image (e.g., a game image or the like) generated by information processing executed by the processing section 21 of the information processing terminal 2. It should be noted that the information processing terminal 2 may include a speaker, a microphone, a camera, and/or the like.

The information processing terminal 2 includes a communication section 25. In the exemplary embodiment, the communication section 25 has the function of connecting to a wireless LAN using a communication module authenticated for Wi-Fi, for example. The processing section 21 connects to the network 3 via a wireless LAN using the communication section 25 (in other words, via the communication section 25) and communicates with another apparatus (e.g., the server 1 or the like). It should be noted that the configuration of the communication section for the information processing terminal 2 to communicate with another apparatus is any configuration. The communication section 25 may have the function of connecting to a mobile communication network (in other words, a mobile phone network) and performing communication, or may have both the function of connecting to a mobile communication network and the function of connecting to a wireless LAN.

[2. Overview of Information Processing]

Next, with reference to FIGS. 4 to 7, a description is given of an overview of information processing executed by the information processing system. Hereinafter, the process of registering a news channel and the process of providing news of the registered news channel for the information processing terminal 2 are mainly described.

[2-1. Overview of Registration Process]

Figure 4:
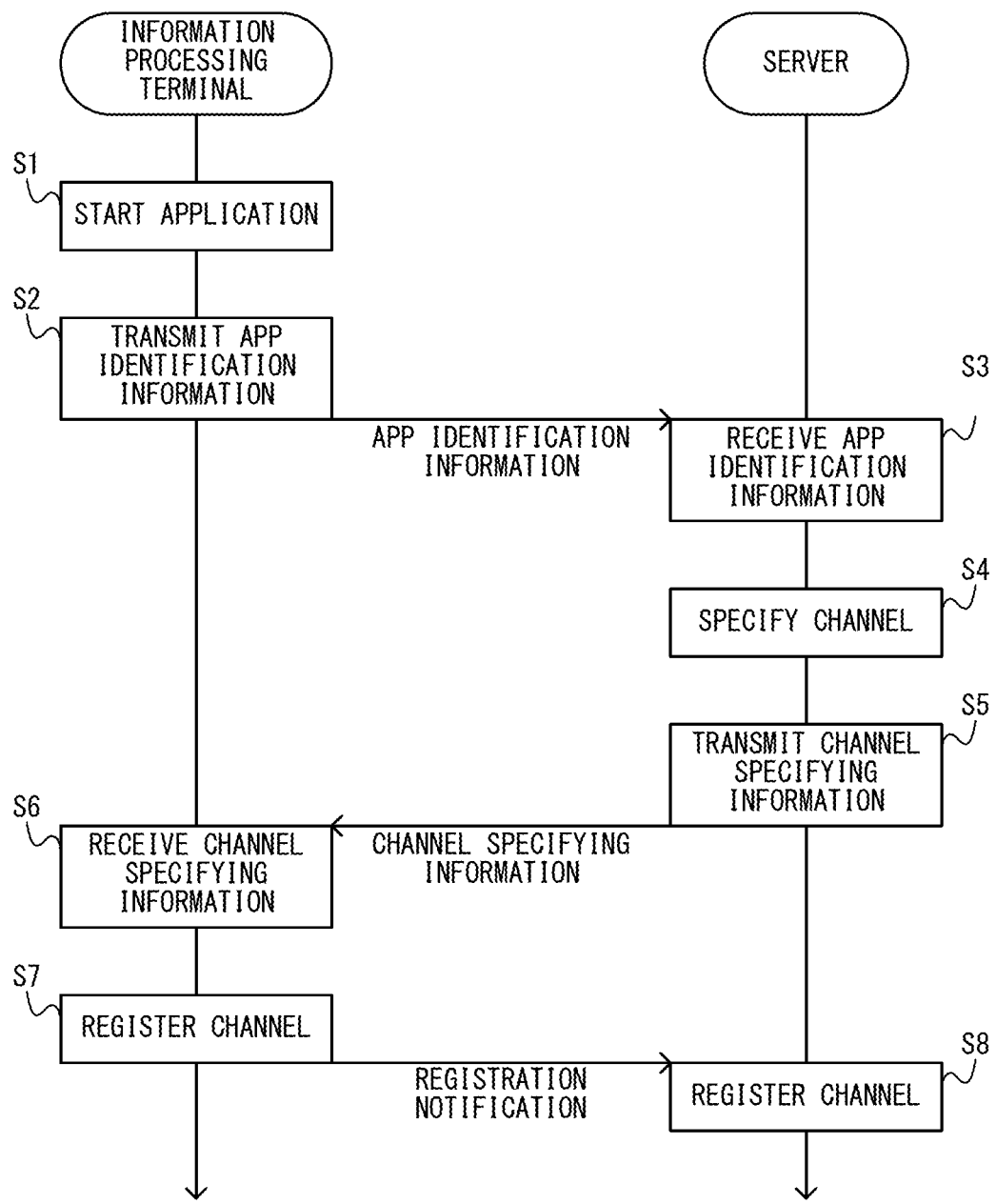
FIG. 4 is a diagram showing a non-limiting example of the flow of the process of registering a news channel.

FIG. 4 is a diagram showing an example of the flow of the process of registering a news channel. In the exemplary embodiment, first, the information processing terminal 2 starts an application in accordance with an instruction given by the user (step S1). When the application is started, the information processing terminal 2 transmits app identification information regarding the application to the server 1 (step S2). The app identification information includes identification information (e.g., ID) allowing the identification of the started application. In the exemplary embodiment, unique identification information is assigned in advance to each application that can be executed by the information processing terminal 2.

Here, the information processing terminal 2 can execute a plurality of applications. The plurality of applications may include a game application and also include an application of a type different from the game application. For example, the plurality of applications include an application for displaying an image (e.g., a menu image or an entrance image) to be displayed first after the information processing terminal 2 is started. In the exemplary embodiment, when any of the applications that can be executed by the information processing terminal 2 is started, the information processing terminal 2 transmits app identification information to the server 1. Alternatively, in another exemplary embodiment, the information processing terminal 2 may execute an application that is not compatible with a news provision service performed by the server 1 (i.e., an application of which app identification information is not transmitted in accordance with the start of the application).

In the exemplary embodiment, every time an application is started in accordance with an instruction of the user, the information processing terminal 2 transmits app identification information of the application to the server 1. That is, even when a certain application that has previously been started is started again, the information processing terminal 2 transmits app identification information to the server 1. Although the details will be described later, this can enable the information processing terminal 2 to efficiently deal with a change in a registration rule in the server 1.

Further, in the exemplary embodiment, in a case where the information processing terminal 2 is in the state where the information processing terminal 2 cannot communicate with the server 1 when an application is started, the information processing terminal 2 transmits app identification information to the server 1 after the information processing terminal 2 becomes able to communicate with the server 1. That is, in the above case, the information processing terminal 2 saves app identification information regarding the started application (see step S44 shown in FIG. 11 described later). Then, when the information processing terminal 2 becomes able to communicate with the server 1 after that, the information processing terminal 2 transmits the saved app identification information to the server 1. According to this, even in a case where the information processing terminal 2 cannot communicate with the server 1 when an application is started, the information processing terminal 2 can certainly transmit app identification information to the server 1.

Further, in the exemplary embodiment, app identification information includes country information and language information. The country information indicates a country to which the user of the information processing terminal 2 belongs. Here, the information processing terminal 2 stores account information of the user. In the exemplary embodiment, the account information includes country information. Thus, the information processing terminal 2 can acquire the country information from the account information stored in the information processing terminal 2 itself and include the acquired country information in app identification information.

The language information indicates a language used in the information processing terminal 2. In the exemplary embodiment, for example, a language is set when the information processing terminal 2 is initialized, and the information processing terminal 2 stores language information indicating the set language. Thus, the information processing terminal 2 can include the language information stored in the information processing terminal 2 itself in app identification information.

The server 1 receives the app identification information transmitted from the information processing terminal 2 (step S3). Then, the server 1 specifies a news channel corresponding to the application indicated by the received app identification information (step S4). In the exemplary embodiment, a news channel is specified using a registration rule table stored in the server 1.

FIG. 5 is a diagram showing an example of the registration rule table. As shown in FIG. 5, the registration rule table is a table indicating the association (i.e., a registration rule) between app identification information (more specifically, a condition regarding app identification information) and channel specifying information. Here, the channel specifying information is information for specifying a news channel and is, for example, information indicating the name of a news channel and/or unique identification information for each news channel. As shown in FIG. 5, in the registration rule table in the exemplary embodiment, a condition regarding an application, a country, and a language indicated by the app identification information is associated with a news channel indicated by the channel specifying information.

Specifically, in the registration rule table shown in FIG. 5, the condition that "the app identification information indicates an application A and also indicates that the country is Japan or the language is Japanese" is associated with an "app A channel". The "app A channel" is, for example, a news channel including Japanese news regarding the application A.

Further, in the registration rule table shown in FIG. 5, the condition that "the app identification information indicates an application B and also indicates that the country is Japan or the language is Japanese" is associated with an "app B channel" and a "development manufacturer X channel". The "app B channel" is, for example, a news channel including Japanese news regarding the application B. The "development manufacturer X channel" is a news channel including Japanese news regarding a development manufacturer X of the application B. As described above, in the registration rule table, a single piece of app identification information may be associated with a plurality of news channels.

Further, in the registration rule table shown in FIG. 5, the condition that "the app identification information indicates an application C and also indicates that the country is a country in the English-speaking world or the language is English" is associated with an "app C channel". The "app C channel" is, for example, a news channel including English news regarding the application C.

As described above, in the registration rule table shown in FIG. 5, an application to be started in the information processing terminal 2 is associated with the news channel of news regarding the application and/or the news channel of news regarding the development manufacturer of the application. However, the association (in other words, the content of the registration rule) between an application and a news channel in the registration rule is any association. For example, in the registration rule, a menu display application for displaying the above menu image may be associated with a shop news channel including news regarding an application that can be purchased and used in the information processing terminal 2.

Further, the registration rule may not be a table format, and may be information in any format indicating the association between app identification information (in other words, an application) and channel specifying information (in other words, a news channel).

When the app identification information received from the information processing terminal 2 satisfies any of the conditions included in the registration rule table, the server 1 specifies a news channel associated with the condition. For example, in the example shown in FIG. 5, when the app identification information indicates the application A and also indicates Japan or Japanese, the server 1 specifies the app A channel.

Next, the server transmits, to the information processing terminal 2, channel specifying information indicating the specified news channel (step S5). The information processing terminal 2, which is the transmission destination of the channel specifying information, is the information processing terminal 2 having transmitted app identification information corresponding to the channel specifying information. It should be noted that when a plurality of news channels are specified in step S4, channel specifying information indicating the plurality of news channels is transmitted from the server 1 to the information processing terminal 2. It should be noted that when the specified news channel has already been registered, the server 1 may not transmit channel specifying information.

The information processing terminal 2 receives the channel specifying information transmitted from the server 1 (step S6). Then, the information processing terminal 2 registers the news channel indicated by the received channel specifying information (step S7). Here, the information processing terminal 2 stores registered channel information indicating a registered news channel regarding the information processing terminal 2 itself. In step S7, the information processing terminal 2 updates the registered channel information by adding the news channel indicated by the received channel specifying information to news channels that have already been registered in the past. It should be noted that when the specified news channel has already been registered, the information processing terminal 2 may not update the registered channel information.

It should be noted that in the exemplary embodiment, a registered news channel is managed on the information processing terminal 2 side and also managed on the server 1 side. Specifically, when newly registering a news channel in the above step S7, the information processing terminal 2 transmits a registration notification to the server 1 (see FIG. 4). The registration notification includes identification information of the newly registered news channel.

When receiving the registration notification from the information processing terminal 2, the server 1 registers the specified news channel regarding the information processing terminal 2 (step S8). Here, the server 1 stores registered channel information similar to the registered channel information stored in the information processing terminal 2. It should be noted that when the information processing system includes a plurality of information processing terminals, the server 1 creates and stores registered channel information for each information processing terminal in advance. In step S8, similarly to the process of step S7 in the information processing terminal 2, the server 1 updates the registered channel information by including a news channel indicated by identification information included in a received registration notification. It should be noted that in another exemplary embodiment, when a news channel is specified in step S4, the server 1 may register the specified news channel. At this time, the information processing terminal 2 may not transmit a registration notification to the server 1.

As described above, in the exemplary embodiment, the registration of a news channel is also managed on the information processing terminal 2 side. Thus, even when the information processing terminal 2 is in the state where the information processing terminal 2 cannot communicate with the server 1 when a registered content is changed, it is possible to reflect a change in the registered content. It should be noted that in the exemplary embodiment, the information processing terminal 2 has the function of connecting to the network 3 via a wireless LAN. Thus, in an environment where the information processing terminal 2 cannot connect to a wireless LAN, a situation is possible where the information processing terminal 2 cannot communicate with the server 1. Further, in the exemplary embodiment, there is a possibility that a registered content is changed every time an application is started. Thus, there is a possibility that a registered content is changed in the situation where the information processing terminal 2 cannot communicate with the server 1. Thus, in the exemplary embodiment, the registration is managed on the information processing terminal 2 side.

Although the details will be described later, in the exemplary embodiment, the user can cancel the registration of a news channel by giving a predetermined cancellation instruction. Meanwhile, as described above, in the exemplary embodiment, every time an application is started, app identification information is transmitted from the information processing terminal 2 to the server 1. Thus, even when an application corresponding to a news channel of which the registration has previously been canceled is started, app identification information is transmitted to the server 1. As a result, channel specifying information is transmitted from the server 1 to the information processing terminal 2. In this case, if the information processing terminal 2 registers the news channel again in accordance with the fact that the channel specifying information is received, the news channel may be registered against the intention of the user having canceled the registration of the news channel.

Thus, in the exemplary embodiment, in the above step S7, when the received channel specifying information indicates a news channel of which the registration has been canceled in the past, the information processing terminal 2 does not register the news channel (see step S50 shown in FIG. 11 described later). It should be noted that in the exemplary embodiment, the information processing terminal 2 stores information (referred to as "canceled channel information") indicating the history of a news channel of which the registration has been canceled. Then, in the above step S7, based on the canceled channel information, the information processing terminal 2 determines whether or not the channel specifying information received from the server 1 indicates a news channel of which the registration has been canceled in the past.

As described above, in the exemplary embodiment, under the condition that a news channel specified by channel specifying information received from the server 1 is not a news channel of which the registration has previously been canceled, the information processing terminal 2 registers the news channel. According to this, it is possible to reduce the possibility that a news channel is registered against the intention of the user.

It should be noted that in the exemplary embodiment, also in the registration process on the server 1 side (step S8), similarly to the registration process on the information processing terminal 2 side, a news channel of which the registration has been canceled in the past is not registered. That is, similarly to the information processing terminal 2, the server 1 also stores the canceled channel information, and based on the canceled channel information, determines whether or not a news channel indicated by the registration notification received from the information processing terminal 2 is a news channel of which the registration has been canceled in the past.

In the exemplary embodiment, when a predetermined registration execution condition is satisfied, processes regarding the registration of a news channel on the information processing terminal 2 side (specifically, the processes of steps S2, S6, and S7) are executed in the background while the started application is being executed (see steps S47 to S51 shown in FIG. 12 described later). Consequently, after an application is started, the information processing terminal 2 can register a news channel soon.

In the exemplary embodiment, the registration execution condition is a condition regarding communication performed in the started application. Specifically, the registration execution condition is that a predetermined communication process is not being executed in the started application. The predetermined communication process is, for example, a communication process in which the amount of communication is relatively large, and more specifically, is the game processing of an online game or the game processing of a communication competition. When the predetermined communication process is not being executed, the information processing terminal 2 executes the processes regarding the registration in the background while the started application is being executed. According to this, the information processing terminal 2 can register a news channel while the application is being executed, without influencing the predetermined communication process in the application. It should be noted that the predetermined communication process does not need to include all communication processes in the started application. For example, the predetermined communication process may not include a communication process in which the amount of communication is relatively small (specifically, the process of merely receiving a notification regarding a game, the process of merely uploading a game result to the server, or the like) among the communication processes in the application.

When the predetermined communication process is executed in the started application, and after the registration execution condition is satisfied (e.g., after the predetermined communication process is completed, or after the application is ended), the information processing terminal 2 executes the above processes regarding the registration. Consequently, even when a predetermined communication process is executed, it is possible to certainly execute processes regarding registration.

In the exemplary embodiment, the above processes regarding the registration regarding an application started by an instruction of the user (occasionally referred to as a "user application") are executed by the function of a system application different from the user application. That is, the information processing terminal 2 executes a predetermined system application, thereby performing the above processes regarding the registration. Thus, the information processing terminal 2 executes the system application in parallel while a started user application is being executed, and thereby can execute the above processes regarding the registration in the background while the user application is being executed.

As described above with reference to FIGS. 4 and 5, in the exemplary embodiment, when the user starts an application in the information processing terminal 2, app identification information is transmitted to the server 1 (step S2), and a news channel corresponding to the application is registered (step S7 or S8). According to this, the information processing terminal 2 can register a news channel corresponding to an application to be used by the user, and the server 1 can provide news corresponding to the application for the information processing terminal 2. Further, in the exemplary embodiment, in accordance with the fact that the user starts an application in the information processing terminal 2, a news channel is automatically registered. Thus, the user does not need to perform a registration operation separately from the operation of starting the application. Thus, it is possible to register a news channel without troubling the user.

Further, in the exemplary embodiment, every time an application is started, the information processing terminal 2 transmits app identification information of the application to the server 1. According to this, when an application is repeatedly used in the information processing terminal 2, app identification information is repeatedly transmitted to the server 1.

Here, in the exemplary embodiment, on the server 1 side, a new news channel may be added, or the association between an application and a news channel may be changed, thereby changing the registration rule. Regarding this, in the exemplary embodiment, at the timing when an application is started in the information processing terminal 2, i.e., at the timing when the user uses the application, a news channel is registered based on the latest registration rule at this time. Thus, at an appropriate timing, the information processing terminal 2 can perform a registration process on which the latest registration rule is reflected.

Further, in the exemplary embodiment, for example, the information processing terminal 2 of a user frequently using a certain application transmits app identification information with high frequency, and thereby can deal with a change in the registration rule regarding the application on the server 1 side with excellent responsiveness. On the other hand, the information processing terminal 2 of a user using a certain application with low frequency transmits app identification information with low frequency. Thus, it is possible to reduce less necessary communication (the transmission of app identification information). As described above, according to the exemplary embodiment, every time an application is started, the information processing terminal 2 transmits app identification information, and thereby can perform a registration process with appropriate frequency.

It should be noted that in another exemplary embodiment, the information processing terminal 2 may not transmit app identification information at all timings when an application is started. For example, with a limit of a predetermined number of times in a predetermined period (specifically, with a limit of once a day), and in accordance with the fact that an application is started, the information processing terminal 2 may transmit app identification information.

As described above, when an application is started multiple times in the information processing terminal 2, then in accordance with at least twice or more starts among the starts made multiple times, the information processing terminal 2 transmits app identification information to the application the server 1. According to this, at an appropriate timing, the information processing terminal 2 can perform a registration process on which the latest registration rule is reflected, and also reduce the possibility that unnecessary communication is performed between the information processing terminal 2 and the server 1. Thus, it is possible to reduce the amount of communication.

(Another Registration Condition)

As described above, in the exemplary embodiment, under the condition that an application is started in the information processing terminal 2 (in other words, under the condition that channel specifying information is transmitted from the server 1 in accordance with the start of an application), a news channel is registered. That is, in the exemplary embodiment, as a condition for the information processing terminal 2 to register a news channel (referred to as a "registration condition"), the fact that an application corresponding to the news channel is started is used. Here, in the exemplary embodiment, the information processing terminal 2 uses, as the registration condition, conditions described below in addition to the fact that an application is started.

In the exemplary embodiment, the information processing terminal 2 uses, as another registration condition, "the fact that the user gives a registration instruction". Specifically, the information processing terminal 2 displays on the display section 24 a list image for news channels provided by the server 1. The list image includes news channels registered in the information processing terminal 2 and news channels that have not yet been registered in the information processing terminal 2. It should be noted that the condition for displaying the list image is any condition, and the timing when the list image is displayed is any timing. For example, in accordance with the fact that the user gives a predetermined display instruction in the information processing terminal 2, the list image is displayed. When the list image is displayed on the display section 24, the information processing terminal 2 receives the input of a registration instruction to newly register a news channel displayed on the list image. In accordance with the fact that the user gives a registration instruction, the information processing terminal 2 newly registers a news channel regarding the registration instruction.

It should be noted that in another exemplary embodiment, the information processing terminal 2 may use, as another registration condition, "the fact that a new application becomes able to be executed in the information processing terminal 2". That is, when a new application is installed in the information processing terminal 2, or when a storage medium having stored therein an application is connected to the information processing terminal 2, the information processing terminal 2 may register a news channel corresponding to the application. It should be noted that a method in which the information processing terminal 2 specifies a news channel to be newly registered is any method. For example, the information processing terminal 2 may transmit app identification information indicating an application that newly becomes able to be executed to the server 1. At this time, the server 1 and the information processing terminal 2 can newly register a news channel by processes similar to the above steps S3 to S8. It should be noted that in another exemplary embodiment, the information processing terminal 2 may store in advance the same registration rule as the registration rule stored in the server 1, and based on the registration rule, specify a news channel corresponding to an uninstalled application.

As described above, in the exemplary embodiment, regardless of whether or not channel specifying information is received from the server 1, the information processing system registers a news channel when a predetermined condition is satisfied. For example, this predetermined condition may be "the fact that the user gives a registration instruction", or may be "the fact that a new application becomes able to be executed in the information processing terminal 2". According to this, it is possible to increase the opportunity to register a news channel. Thus, it is possible to further improve convenience for the user.

(Cancellation of Registration)

It should be noted that when a predetermined cancellation condition is satisfied, the registration of a registered news channel can be canceled. In the exemplary embodiment, in accordance with a cancellation instruction given by the user, the information processing terminal 2 cancels the registration of a news channel that has already been registered. For example, when the above list image is displayed on the display section 24, the information processing terminal 2 receives the input of a cancellation instruction to cancel the registration of a news channel that is displayed on the list image and has already been registered. In accordance with the fact that the user gives a cancellation instruction, the information processing terminal 2 cancels the registration of a news channel regarding the cancellation instruction.

It should be noted that in another exemplary embodiment, when an application is uninstalled from the information processing terminal 2, the information processing terminal 2 may cancel the registration of a news channel corresponding to the application. It should be noted that a method for specifying a news channel of which the registration is to be canceled is any method. For example, the information processing terminal 2 may transmit, to the server 1, canceled app information indicating an uninstalled application. At this time, in the registration rule, the server 1 specifies a news channel associated with the application indicated by the canceled app information received from the information processing terminal 2, cancels the registration of the news channel, and transmits, to the information processing terminal 2, canceled channel information indicating the news channel. The information processing terminal 2 cancels the registration of the news channel indicated by the canceled channel information received from the server 1. It should be noted that in another exemplary embodiment, the information processing terminal 2 may store the same registration rule as the registration rule stored in the server 1 in advance, and based on the registration rule, specify a news channel corresponding to an uninstalled application. It should be noted that before the registration of a news channel is canceled, the information processing terminal 2 may confirm with the user whether or not the registration is allowed to be canceled.

In the exemplary embodiment, as described above, there is a case where a news channel is registered or canceled on the information processing terminal 2 side. In this case, registered channel information in the information processing terminal 2 and registered channel information in the server 1 are synchronized where necessary so that the contents of the registered channel information in the information processing terminal 2 and the registered channel information in the server 1 match each other. Specifically, in the above case, the information processing terminal 2 transmits change information indicating a change regarding the content of the registration of the news channel to the server 1. Based on the change information received from the information processing terminal 2, the server 1 updates the content of the registered channel information. Consequently, it is possible to match the contents of the registered channel information of the information processing terminal 2 and the registered channel information of the server 1.

(Change Regarding Country Information or Language Information)

In the exemplary embodiment, also when an account of the user is added, or the setting of the language is changed in the information processing terminal 2, a news channel may be newly registered similarly to a case where an application is started. The details are described below.

In the exemplary embodiment, when an account of the user corresponding to a new country is newly registered in the information processing terminal 2, the information processing terminal 2 transmits country information to the server 1. It should be noted that in the exemplary embodiment, accounts of a plurality of users can be registered in a single information processing terminal 2. When an account of a new user is registered in the information processing terminal 2, then first, the information processing terminal 2 determines whether or not a country corresponding to the registered account (i.e., a country indicated by country information included in account information of the account) is a new country. That is, the information processing terminal 2 determines whether or not the country corresponding to the registered account is different from countries corresponding to one or more accounts that have already been registered. Then, when it is determined that the country corresponding to the registered account is a new country, the information processing terminal 2 acquires the country information included in the registered account information and transmits the acquired country information to the server 1. On the other hand, when it is determined that the country corresponding to the registered account is not a new country, country information is not transmitted.

When receiving the country information from the information processing terminal 2, then based on the country indicated by the newly received country information and an application indicated by app identification information acquired by the information processing terminal 2 in the past, the server 1 specifies a news channel to be registered. That is, the server 1 determines whether or not a condition included in the registration rule is satisfied. When the condition is satisfied, the server 1 specifies a news channel associated with the satisfied condition. As a result, processes similar to the above steps S5 to S8 are executed, thereby newly registering the specified news channel. For example, in the example shown in FIG. 5, a case is considered where in the state where only an account corresponding to Japan is registered, and the language is set to Japanese in the information processing terminal 2, an account corresponding to a country in the English-speaking world (e.g., the United States of America) is newly registered. In this case, the information processing terminal 2 transmits, to the server 1, app identification information including country information indicating the United States of America. Here, when the server 1 has received app identification information indicating the application C from the information processing terminal 2 in the past, the server 1 specifies the app C channel.

Further, in the exemplary embodiment, when the setting of the language is changed in the information processing terminal 2, the information processing terminal 2 transmits language information to the server 1. That is, when the setting of the language is changed in the information processing terminal 2, the information processing terminal 2 transmits, to the server 1, language information indicating the language after the change. When receiving the language information from the information processing terminal 2, then based on the language indicated by the newly received language information and an application indicated by app identification information acquired from the information processing terminal 2 in the past, the server 1 specifies a news channel to be registered. This specifying method is similar to the method for specifying a news channel in a case where country information is received.

It should be noted that in the exemplary embodiment, the registration of a news channel is managed on an information-processing-terminal-by-information-processing-terminal basis, and news is provided in the situation where an account of a user who is using the information processing terminal 2 is not specified. For example, after the information processing terminal 2 is started, the above list image is displayed on the display section 24 in the state where an account of the user is not specified. Further, news on the same news channel is provided regardless of an account of a user who is using the information processing terminal 2.

Thus, in the exemplary embodiment, as described above, in accordance with the addition of an account of a user in the information processing terminal 2 or in accordance with a change in the language in the information processing terminal 2, the registration of a news channel can be updated.

[2-2. Overview of News Provision Process]

Figure 6:
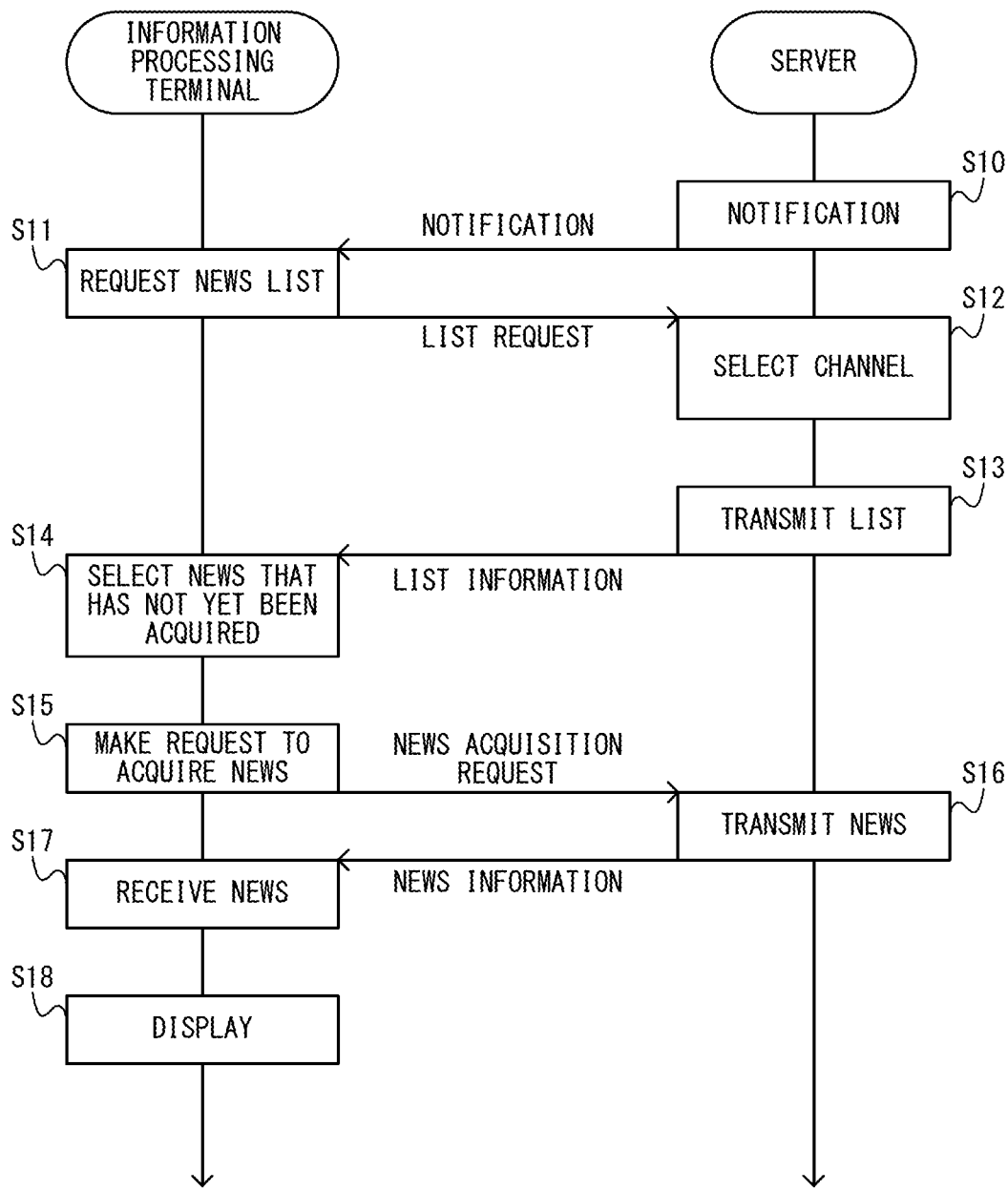
FIG. 6 is a diagram showing a non-limiting example of the flow of the process in which the server provides news for the information processing terminal.

FIG. 6 is a diagram showing an example of the flow of the process in which the server provides news for the information processing terminal. In the exemplary embodiment, first, at an appropriate timing, the server 1 gives a notification that there is news to be transmitted (step S10). The timing when this notification is given is any timing. For example, when new news is added, and/or at predetermined time intervals, the server 1 gives the above notification.

When receiving the notification from the server 1, the information processing terminal 2 requests a news list (step S11). Here, the news list is a list of news that is currently being distributed from the server 1 to each information processing terminal. In the exemplary embodiment, a news list is prepared for each news channel. It should be noted that the information processing terminal 2 may request a news list, for example, in the following cases in addition to a case where the information processing terminal 2 receives a notification from the server 1.

A case where the information processing terminal 2 shifts from the state where the information processing terminal 2 cannot communicate with the server 1 to the state where the information processing terminal 2 can communicate with the server 1

A case where the information processing terminal 2 is turned on

A case where the user gives an instruction

When receiving from the information processing terminal 2 the request for a news list, the server 1 selects a news channel of which the news list is to be transmitted to the information processing terminal 2 (step S12). That is, the server 1 selects a news channel registered regarding the information processing terminal 2. It should be noted that when a plurality of news channels are registered regarding the information processing terminal 2, the plurality of news channels are selected. The server 1 transmits list information including the news list of the selected news channel to the information processing terminal 2 (step S13).

Figure 7:
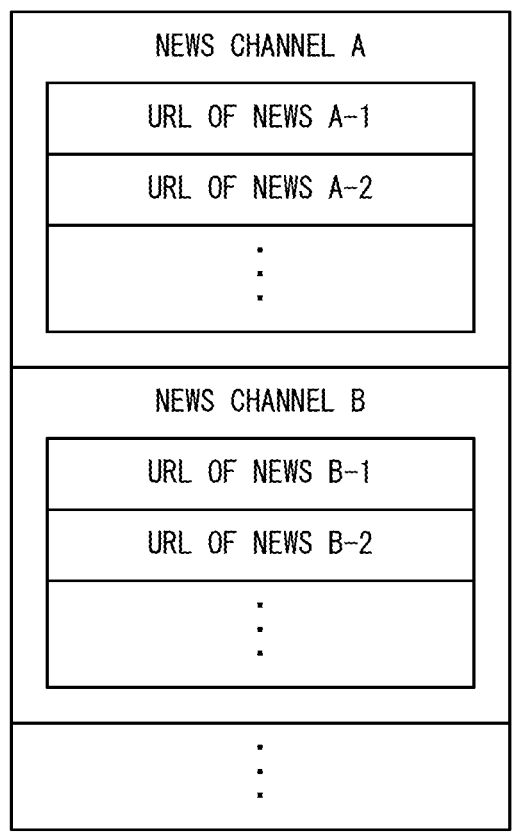
FIG. 7 is a diagram showing a non-limiting example of list information.

FIG. 7 is a diagram showing an example of the list information. In FIG. 7, the list information includes news lists regarding a news channel A and a news channel B. As shown in FIG. 7, the list information indicates a news list for each news channel. Further, the news list includes information indicating news that is being distributed. In the exemplary embodiment, the news list includes, as the information, information of a URL (the URLs of news A-1, A-2, B-1, and B-2 in FIG. 7). It should be noted that the number of news lists included in the list information may be any number, and the number of pieces of news included in each news list may be any number.

Referring back to FIG. 6, when receiving the list information from the server 1, the information processing terminal 2 selects, from the news list included in the list information, news that has not yet been acquired by the information processing terminal 2 itself (step S14). It should be noted that the information processing terminal 2 saves, in advance, data of news acquired in the process of step S17 described later, and in the process of step S14, selects news that is not saved. Further, the timing when the information processing terminal 2 executes the process of selecting news is any timing. For example, this timing may be the timing when the above list image is displayed on the display section 24, or may be the timing when the list information is received.

Next, the information processing terminal 2 makes a request to acquire the selected news (step S15). Specifically, the information processing terminal 2 accesses the URL of the selected news included in the news list received from the server 1. It should be noted that the timing when the information processing terminal 2 makes a request to acquire the news is any timing. For example, in accordance with the fact that a user instruction to display the news is given to the information processing terminal 2, the information processing terminal 2 makes a request to acquire the news.

When receiving from the information processing terminal 2 the request to acquire the news, the server 1 transmits, to the information processing terminal 2, data of the news regarding the request (step S16). The information processing terminal 2 receives the data of the news from the server 1 (step S17) and displays the news indicated by the received data of the news on the display section 24 (step S18).

As described above with reference to FIGS. 6 and 7, in the exemplary embodiment, under the condition that news is included in a registered news channel, the server 1 transmits the news among a news group that can be provided (step S16). The information processing terminal 2 receives the news from the server 1 and displays the received news on the display section 24. Consequently, the server 1 can provide news belonging to a registered news channel for the information processing terminal 2.

[3. Specific Example of Process Performed by each Apparatus]

Next, with reference to FIGS. 8 to 12, a description is given of a specific example of a process performed by each apparatus (i.e., the server 1 and the information processing terminal 2) included in the information processing system according to the exemplary embodiment.

[3-1. Process Performed by Server 1]

Figure 8:
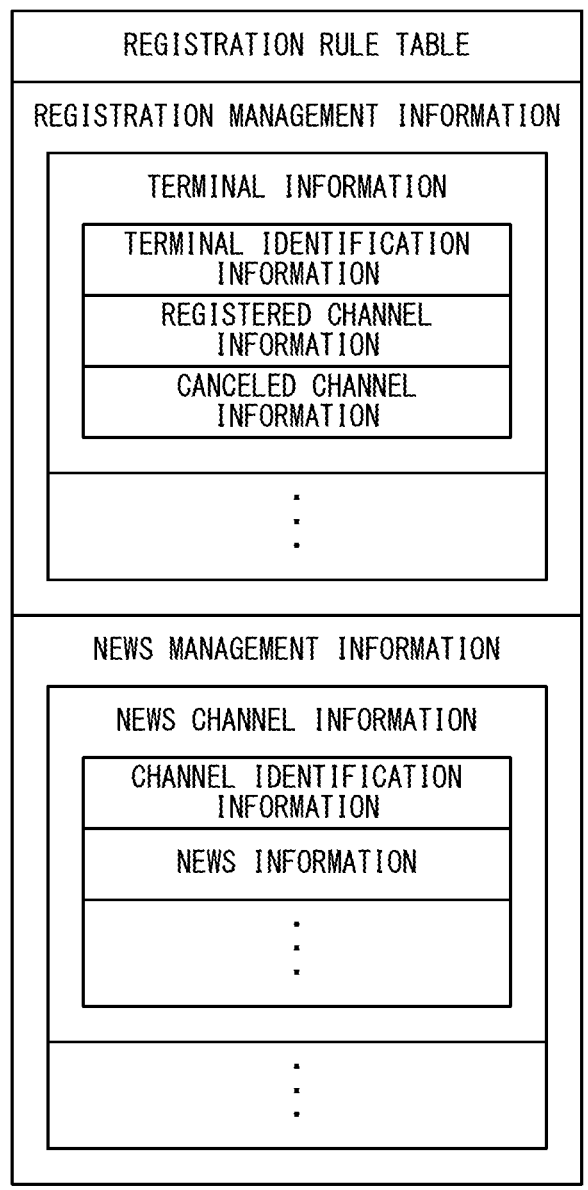
FIG. 8 is a diagram showing non-limiting examples of various pieces of information used in a process executed by the server.

First, a description is given of an example of the process executed by the server 1. FIG. 8 is a diagram showing examples of various pieces of information to be used in the process executed by the server 1. The various pieces of information shown in FIG. 8 are stored, for example, in the storage section 12 of the server 1.

As shown in FIG. 8, the storage section 12 stores the above registration rule table and registration management information. The registration management information includes terminal identification information, the above registered channel information, and the above canceled channel information. The terminal identification information is unique identification information (e.g., ID) for each information processing terminal. It should be noted that when the information processing system includes a plurality of information processing terminals, registration management information is created and stored for each information processing terminal.

Further, as shown in FIG. 8, the storage section 12 stores news management information. The news management information includes news channel information for each news channel. The news channel information includes channel identification information and news information. The channel identification information is information similar to the above channel specifying information, and for example, is information indicating the name of a news channel and/or unique identification information for each news channel. The news information includes data of news, information indicating a URL for accessing the data, and information indicating whether or not the news is being distributed. It should be noted that in the exemplary embodiment, the news channel information includes news information for each piece of news belonging to a news channel.

Figure 9:
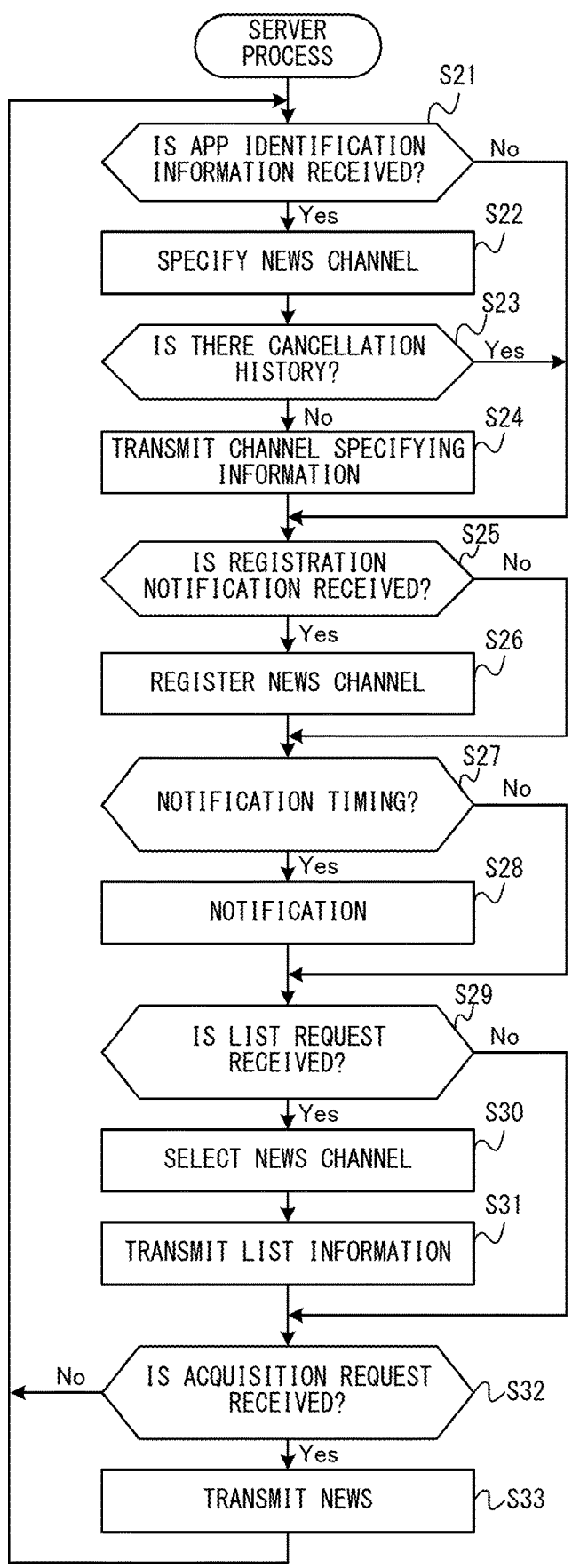
FIG. 9 is a flow chart showing a non-limiting example of the flow of the process executed by the server.

FIG. 9 is a flow chart showing an example of the flow of the process executed by the server 1 (referred to as a "server process"). It should be noted that a series of processes shown in FIG. 9 is continuously executed during the operation of the server 1. It should be noted that in the exemplary embodiment, a description is given on the assumption that the processing section 11 (specifically, the CPU) of the server 1 executes the server-side program, thereby executing the processes of steps shown in FIG. 9. Alternatively, the processes of some of the steps in the flow chart may be executed by a processor other than the CPU, or a dedicated circuit.

Further, the processes of all of the steps in the flow chart shown in FIG. 9 (and also flow charts in FIGS. 11 and 12 described later) are merely illustrative. Thus, the processing order of the steps may be changed, or another process may be performed in addition to (or instead of) the processes of all of the steps, so long as similar results are obtained.

Further, the processing section 11 of the server 1 executes the processes of the steps shown in FIG. 9, using the memory (the same applies to the processing section 21 of the information processing terminal 2 executing the processes of steps in FIGS. 11 and 12 described later). That is, the CPU of the processing section 11 stores, in the memory, information (in other words, data) obtained by each processing step. Then, when the information is to be used in the subsequent processing steps, the CPU reads the information from the memory and uses the information.

In step S21 shown in FIG. 9, the processing section 11 determines whether or not app identification information is received from the information processing terminal 2. That is, the processing section 11 determines whether or not the communication section 13 receives app identification information from the information processing terminal 2. When the result of the determination is affirmative in step S21, the process of step S22 is executed. On the other hand, when the result of the determination is negative in step S21, the processes of steps S22 to S25 are skipped, and the process of step S27 described later is executed.

In step S22, the processing section 11 specifies a news channel corresponding to the app identification information received from the information processing terminal 2. That is, based on the registration rule table stored in the storage section 12, the processing section 11 specifies a news channel. The news channel is specified by the method described above in "[2-1. Overview of Registration Process]" (step S4 shown in FIG. 4). After step S22, the process of step S23 is executed.

In step S23, the processing section 11 determines whether or not the specified news channel is a news channel of which the registration has been canceled in the past (in other words, whether or not the specified news channel has a history in which the registration has been canceled). Based on the canceled channel information stored in the storage section 12, the processing section 11 makes the determination. When the result of the determination is negative in step S23, the process of step S24 is executed. On the other hand, when the result of the determination is affirmative in step S23, the process of step S24 is skipped, and the process of step S25 described later is executed. In this case, the news channel is not registered.

In step S24, the processing section 11 causes the communication section 13 to transmit, to the information processing terminal 2, channel specifying information indicating the news channel specified in step S22 (step S5 shown in FIG. 4). After step S24, the process of step S25 is executed.

In step S25, the processing section 11 determines whether or not the above registration notification is received from the information processing terminal 2. That is, the processing section 11 determines whether or not the communication section 13 receives a registration notification from the information processing terminal 2. When the result of the determination is affirmative in step S25, the process of step S26 is executed. On the other hand, when the result of the determination is negative in step S25, the process of step S26 is skipped, and the process of step S27 described later is executed.

In step S26, the processing section 11 registers the news channel indicated by the registration notification received from the information processing terminal 2 (step S8 shown in FIG. 4). That is, the processing section 11 updates the registered channel information stored in the storage section 12, by including the news channel indicated by the registration notification. After step S26, the process of step S27 is executed.

In step S27, the processing section 11 determines whether or not the timing of giving the information processing terminal 2 a notification that there is news to be transmitted arrives. When the result of the determination is affirmative in step S27, the process of step S28 is executed. On the other hand, when the result of the determination is negative in step S27, the process of step S28 is skipped, and the process of step S29 described later is executed.

In step S28, the processing section 11 gives the information processing terminal 2 a notification that there is news to be transmitted (step S10 shown in FIG. 6). It should be noted that in accordance with this notification, the information processing terminal 2 requests a news list from the server 1 (step S57 shown in FIG. 12). After step S28, the process of step S29 is executed.

In step S29, the processing section 11 determines whether or not the request for a news list is received from the information processing terminal 2. That is, the processing section 11 determines whether or not the communication section 13 receives, from the information processing terminal 2, information indicating the above request. When the result of the determination is affirmative in step S29, the process of step S30 is executed. On the other hand, when the result of the determination is negative in step S29, the processes of steps S30 and S31 are skipped, and the process of step S32 described later is executed.

In step S30, the processing section 11 selects a news channel of which the news list is to be transmitted to the information processing terminal 2 (step S12 shown in FIG. 6). That is, the processing section 11 selects a news channel indicated by the registered channel information stored in the storage section 12 and regarding the information processing terminal 2 (in other words, a registered news channel). After step S30, the process of step S31 is executed.

In step S31, the processing section 11 transmits list information including a news list regarding the news channel selected in step S30 to the information processing terminal 2 (step S13). That is, based on the news management information stored in the storage section 12, the processing section 11 generates a news list regarding the selected news channel. Then, using the communication section 13, the processing section 11 transmits list information including the generated news list to the information processing terminal 2. It should be noted that receiving the list information, the information processing terminal 2 makes a request to acquire news to the server 1 (step S59 shown in FIG. 12). After step S31, the process of step S32 is executed.

In step S32, the processing section 11 determines whether or not the request to acquire news is received from the information processing terminal 2. That is, the processing section 11 determines whether or not the communication section 13 receives information indicating the above request from the information processing terminal 2. When the result of the determination is affirmative in step S32, the process of step S33 is executed. On the other hand, when the result of the determination is negative in step S32, the process of step S21 is executed again.

In step S33, the processing section 11 causes the communication section 13 to transmit, to the information processing terminal 2, data of the news regarding the request received in step S32. After step S33, the process of step S21 is executed again.

The processing section 11 repeatedly executes the series of processes in the above steps S21 to S33. It should be noted that when a plurality of information processing terminals access the server 1, the processing section 11 may execute the above series of processes for the information processing terminals in parallel.

[3-2. Process Performed by Information Processing Terminal 2]

Figure 10:
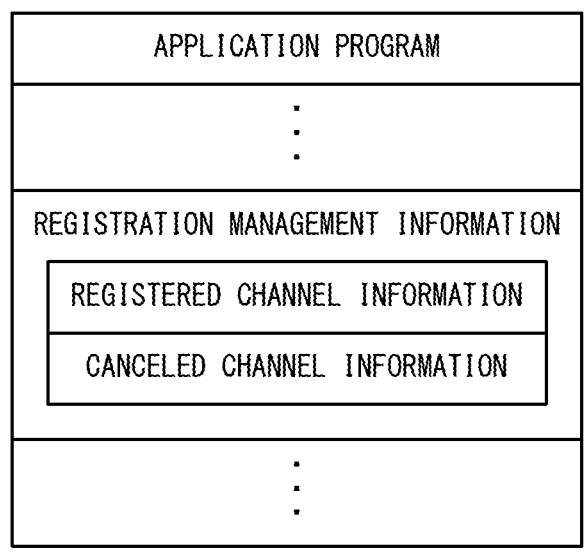
FIG. 10 is a diagram showing non-limiting examples of various pieces of information used in a process executed by the information processing terminal.

Next, a description is given of an example of the process executed by the information processing terminal 2. FIG. 10 is a diagram showing examples of various pieces of information to be used in the process executed by the information processing terminal 2. The various pieces of information shown in FIG. 10 are stored, for example, in the storage section 22 of the information processing terminal 2 or the memory of the processing section 11.

As shown in FIG. 10, the storage section 22 stores an application program and registration management information. The application program is a program for an application (including the above user application and the above system application) that can be executed by the information processing terminal 2. The registration management information includes the above registered channel information and the above canceled channel information.

Figure 11:
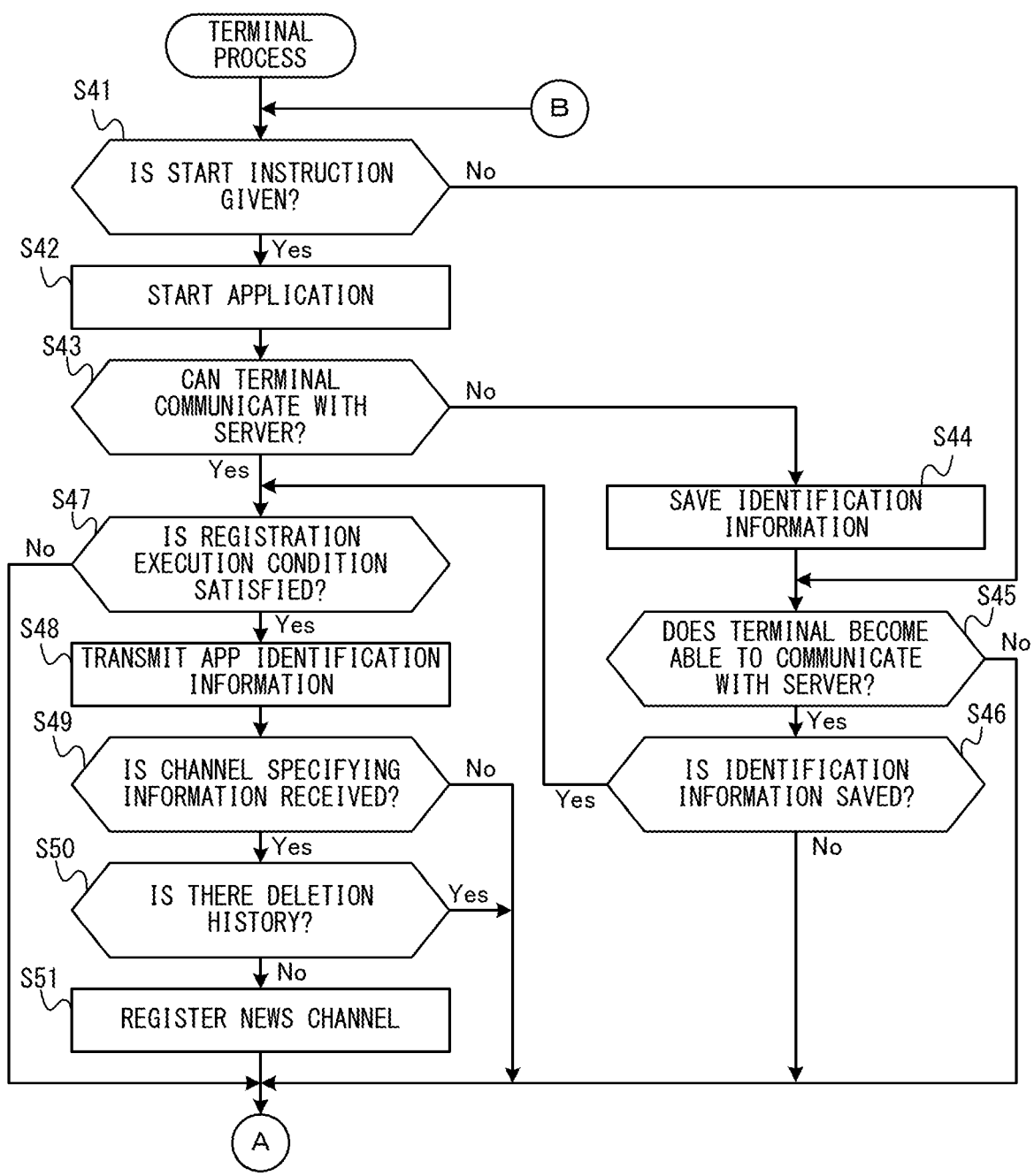
FIG. 11 is a flow chart showing a non-limiting example of the flow of the process executed by the information processing terminal.
Figure 12:
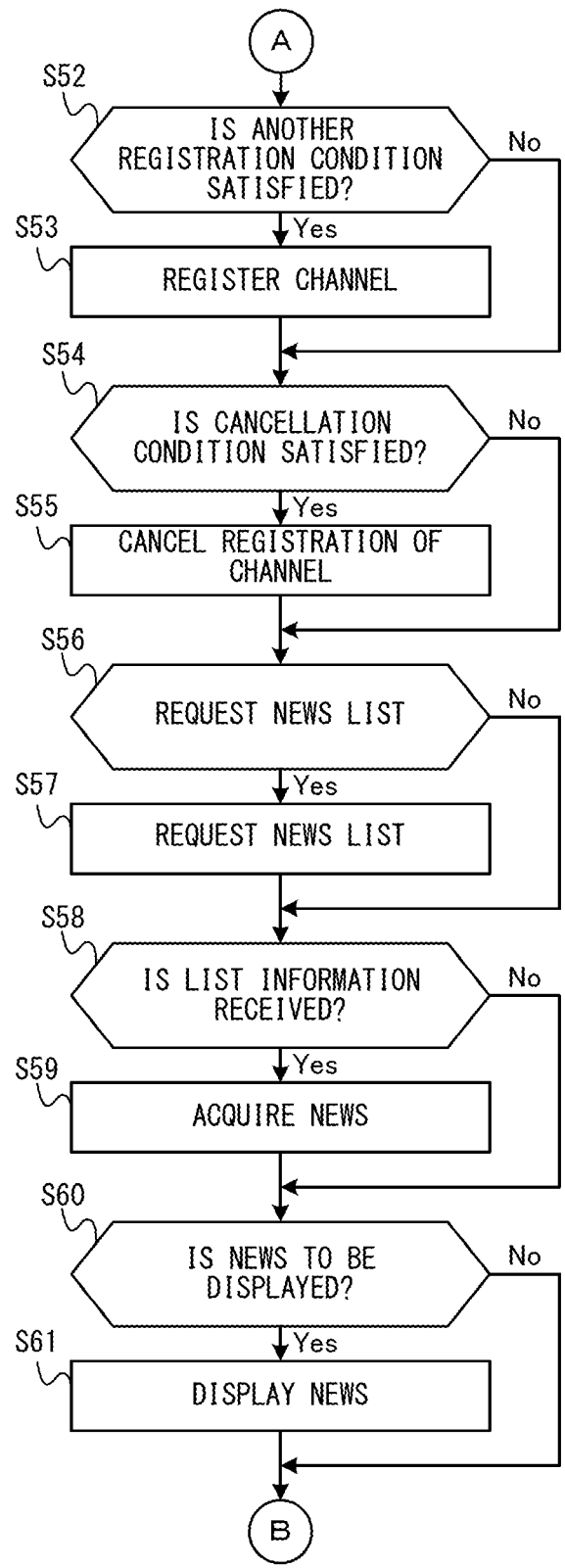
FIG. 12 is a flow chart showing a non-limiting example of the flow of the process executed by the information processing terminal.

FIGS. 11 and 12 are flow charts showing an example of the flow of the process executed by the information processing terminal 2 (referred to as a "terminal process"). It should be noted that a series of processes shown in FIGS. 11 and 12 is continuously executed during the operation of the information processing terminal 2. However, when the information processing terminal 2 is in a sleep state, part or all of the above series of processes may not be executed. It should be noted that in the exemplary embodiment, a description is given on the assumption that the processing section 21 (specifically, the CPU) of the information processing terminal 2 executes a program (e.g., an OS (operating system) program) stored in the storage section 22, thereby executing the processes of steps shown in FIGS. 11 and 12. Alternatively, the processes of some of the steps in the flow charts may be executed by a processor other than the CPU, or a dedicated circuit.

In step S41 shown in FIG. 11, first, the processing section 21 determines whether or not an instruction to start an application is given by the user. That is, the processing section 21 acquires, from the input section 23, input information indicating an input to the input section 23 and determines whether or not an instruction is input. When the result of the determination is affirmative in step S41, the process of step S42 is executed. On the other hand, when the result of the determination is negative in step S41, the process of step S45 described later is executed.

In step S42, the processing section 21 starts the application for which the start instruction is given by the user (step S1 shown in FIG. 4). That is, the processing section 21 starts the execution of a program for the application stored in the storage section 22. After step S42, the process of step S43 is executed.

In step S43, the processing section 21 determines whether or not the information processing terminal 2 can communicate with the server 1. For example, the processing section 21 determines whether or not the communication section 25 is connected to a wireless LAN, or whether or not the communication section 25 can communicate with the server 1 via a wireless LAN. When the result of the determination is negative in step S43, the process of step S44 is executed. On the other hand, when the result of the determination is affirmative in step S43, the process of step S47 described later is executed.

In step S44, the processing section 21 saves identification information of the application started in step S42 in the storage section 22. After step S44, the process of step S45 is executed.

In step S45, the processing section 21 determines whether or not the information processing terminal 2 becomes able to communicate with the server 1. It should be noted that the processing section 21 makes the determination in step S45 by a method similar to that of the determination process in the above step S43. When the result of the determination is affirmative in step S45, the process of step S46 is executed. On the other hand, when the result of the determination is negative in step S45, the process of step S52 described later is executed.

In step S46, the processing section 21 determines whether or not the identification information of the application is saved in the storage section 22. This determination process is the process of determining whether or not the identification information of the application is saved in the process of step S44 while the information processing terminal 2 is offline (i.e., during the period in which the information processing terminal 2 cannot communicate with the server 1). When the result of the determination is affirmative in step S46, the process of step S47 is executed. On the other hand, when the result of the determination is negative in step S46, the process of step S52 described later is executed.

In step S47, the processing section 21 determines whether or not the above registration execution condition is satisfied. That is, the processing section 21 determines whether or not a predetermined communication process is executed in the application that is started in step S42 and being executed. When the result of the determination is affirmative in step S47, the process of step S48 is executed. On the other hand, when the result of the determination is negative in step S47, the process of step S52 described later is executed. In this case, the processes regarding the registration of a news channel are not executed at the current moment.

In step S48, the processing section 21 transmits app identification information regarding the application started in step S42 to the server 1 (step S2 shown in FIG. 4). That is, based on information stored in the storage section 22 (specifically, the identification information of the application, country information, and language information), the processing section 21 generates app identification information and causes the communication section 25 to transmit the generated app identification information to the server 1. In response to this, when there is a news channel to be newly registered, the server 1 transmits channel specifying information to the information processing terminal 2 (steps S21 to S25 shown in FIG. 9). After step S48, the process of step S49 is executed.

In step S49, the processing section 21 determines whether or not the channel specifying information is received from the server 1. That is, the processing section 21 determines whether or not the communication section 25 receives the channel specifying information from the server 1. When the result of the determination is affirmative in step S49, the process of step S50 is executed. On the other hand, when the result of the determination is negative in step S49, the processes of steps S50 and S51 are skipped, and the process of step S52 described later is executed.

In step S50, the processing section 21 determines whether or not a news channel indicated by the channel specifying information received in step S49 is a news channel of which the registration has been canceled in the past. Based on the canceled channel information stored in the storage section 22, the processing section 21 makes the determination. When the result of the determination is negative in step S50, the process of step S51 is executed. On the other hand, when the result of the determination is affirmative in step S50, the process of step S51 is skipped, and the process of step S52 described later is executed.

In step S51, the processing section 21 registers the news channel indicated by the channel specifying information received in step S49 (step S7 shown in FIG. 4). That is, the processing section 21 updates the registered channel information stored in the storage section 22, by including the news channel. Further, the processing section 21 transmits to the server 1 a registration notification indicating the news channel. That is, the processing section 21 generates information of a registration notification including identification information indicating the news channel and causes the communication section 25 to transmit the generated information of the registration notification to the server 1. In response to this, the server 1 registers the news channel indicated by the registration notification (step S26 shown in FIG. 9). After step S51, the process of step S52 is executed.

It should be noted that although not shown in FIGS. 11 and 12, when an account of a user corresponding to a new country is newly registered in the information processing terminal 2, or when the setting of the language is changed in the information processing terminal 2, the processing section 21 executes processes similar to the series of processes in the above steps S43 to S51. It should be noted that in this case, in step S44, country information or language information is saved instead of the identification information of the application, and in step S48, country information or language information is transmitted instead of the app identification information to the server 1. Consequently, also in the above case, it is possible to newly register a news channel similarly to a case where an application is started.

In step S52, the processing section 21 determines whether or not another registration condition described above (i.e., the fact that the user gives a registration instruction) is satisfied. When the result of the determination is affirmative in step S52, the process of step S53 is executed. On the other hand, when the result of the determination is negative in step S52, the process of step S53 is skipped, and the process of step S54 described later is executed.

In step S53, the processing section 21 registers a news channel regarding the registration instruction given by the user. It should be noted that a specific process for registering the news channel in step S53 is similar to the above process of step S51. After step S53, the process of step S54 is executed.

In step S54, the processing section 21 determines whether or not the above cancellation condition is satisfied. When the result of the determination is affirmative in step S54, the process of step S55 is executed. On the other hand, when the result of the determination is negative in step S54, the process of step S55 is skipped, and the process of step S56 described later is executed.

In step S55, the processing section 21 cancels the registration of a news channel satisfying the cancellation condition. It should be noted that a method for specifying the news channel satisfying the cancellation condition is as described above in "(Cancellation of Registration)". The processing section 21 updates the registered channel information stored in the storage section 22, by deleting the news channel satisfying the cancellation condition from news channels that have already been registered. After step S55, the process of step S56 is executed.

In step S56, the processing section 21 determines whether or not the processing section 21 is to request a news list from the server 1. That is, in the various cases described above in "[2-2. Overview of News Provision Process]", the processing section 21 determines that the processing section 21 is to request a news list. When the result of the determination is affirmative in step S56, the process of step S57 is executed. On the other hand, when the result of the determination is negative in step S56, the process of step S57 is skipped, and the process of step S58 described later is executed.

In step S57, the processing section 21 requests a news list from the server 1. That is, the processing section 21 causes the communication section 25 to transmit information indicating the above request to the server 1. In response to this, the server 1 transmits list information including the news list regarding the above request to the information processing terminal 2 (steps S29 to S31 shown in FIG. 9). After step S57, the process of step S58 is executed.

In step S58, the processing section 21 determines whether or not the list information is received from the server 1. That is, the processing section 21 determines whether or not the communication section 25 receives the list information from the server 1. When the result of the determination is affirmative in step S58, the process of step S59 is executed. On the other hand, when the result of the determination is negative in step S58, the processes of steps S59 and S60 are skipped, and the process of step S61 described later is executed.

In step S59, the processing section 21 acquires news that has not yet been acquired by the information processing terminal 2. It should be noted that the process of acquiring the news is the series of processes in steps S14 to S17 shown in FIG. 6. That is, the processing section 21 acquires the news by executing the processes of the above step S14, S15, and S17. After step S59, the process of step S60 is executed.

In step S60, the processing section 21 determines whether or not the news is to be displayed. The processing section 21 makes the determination in step S60, for example, based on whether or not the user gives an instruction to display the news, or whether or not the timing when the news is automatically displayed arrives (e.g., the information processing terminal 2 is started). When the result of the determination is affirmative in step S60, the process of step S61 is executed. On the other hand, when the result of the determination is negative in step S60, the process of step S61 is skipped, and the above process of step S41 is executed again.

In step S61, the processing section 21 displays the news on the display section 24 (step S18 shown in FIG. 6). It should be noted that the displayed news may be, for example, news selected by the user from a plurality of pieces of news of which the titles are displayed on a list image, or may be news selected in accordance with an algorithm determined in advance (e.g., news acquired last). After step S61, the above process of step S41 is executed again. Thereafter, the information processing terminal 2 repeatedly executes the series of processes in steps S41 to S61.

[4. Operation and Effect and Variations of Exemplary Embodiment]

According to the above exemplary embodiment, the information processing terminal 2 has the following configurations.

Application start means (step S42) for starting an application in accordance with an instruction of the user Identification information transmission means (step S48) for transmitting identification information of the started application (i.e., app identification information) to the server 1 Further, the server 1 has the following configurations.

Specifying information storage means (i.e., the storage section 12 for storing a registration rule) for storing specifying information for specifying, from among a content (i.e., news) group, a group of contents (i.e., a news channel) as a target to be transmitted to the information processing terminal (i.e., channel specifying information), in association with the identification information of the application Identification information reception means (step S21) for receiving identification information from the information processing terminal 2

Specifying information selection means (step S22) for selecting, from among the specifying information stored in the specifying information storage means, specifying information associated with the identification information received from the information processing terminal 2

Further, the information processing system has the following configuration.

Registration means (step S26 or S51) for registering a group specified by the selected specifying information, as a target to be transmitted to the information processing terminal 2 regarding the information processing terminal (Variations Regarding Registration of Content)

In the above exemplary embodiment, the information processing system manages registration on the basis of a news channel to which news belongs. Here, in another exemplary embodiment, the information processing system may manage registration on a news-by-news basis. In this case, the server 1 stores, as a registration rule, information in which an application and news are associated with each other. That is, the specifying information storage means stores specifying information for specifying, from among a content (i.e., news) group, a content as a target to be transmitted to the information processing terminal, in association with identification information of an application. Also based on this, similarly to the above exemplary embodiment, the server 1 can provide news corresponding to a started application for the information processing terminal 2.

It should be noted that in the above exemplary embodiment, both the server 1 and the information processing terminal 2 include the registration means. Here, in another exemplary embodiment, only either one of the server 1 and the information processing terminal 2 may include the registration means. That is, the registration of a news channel may be managed by only either one of the server 1 and the information processing terminal 2. It should be noted that "registering regarding the information processing terminal" refers to, for example, registration in association with identification information of the information processing terminal (or information of an account of the user of the information processing terminal), and registration in the information processing terminal. That is, the registration means may be means for executing the process of storing the above registered channel information in association with identification information of the information processing terminal, or may be means for executing the process of storing the registered channel information in the information processing terminal.

(Variation Regarding Operation as Trigger for Registration)

In the above exemplary embodiment, a news channel is registered using as a trigger the fact that an application is started in the information processing terminal 2. Here, an operation used as a trigger for the registration of a news channel is not limited to the start of an application. For example, in another exemplary embodiment, in accordance with the operation of making a new application executable in the information processing terminal 2, the information processing terminal 2 may transmit app identification information regarding the application to the server 1. That is, the information processing terminal 2 may transmit, to the server 1, app identification information regarding an application started in the information processing terminal 2 and/or an application having newly become able to be executed in the information processing terminal 2. Further, in another exemplary embodiment, in accordance with the fact that an application is registered in favorites in a shop application, the information processing terminal 2 may transmit app identification information regarding the application to the server 1. It should be noted that the shop application is an application having, for example, the function of accessing a server for providing an application that can be executed by the information processing terminal 2, and the function of enabling the user to purchase the application. As described above, in accordance with the fact that a predetermined operation regarding an application (e.g., the operation of starting an application, the operation of making a new application executable, or the operation of registering an application in favorites) is performed in the information processing terminal 2, the information processing terminal 2 may transmit app identification information to the server 1.

(Variations Regarding Management of Registration)

In the above exemplary embodiment, the registration of a news channel is managed with respect to each information processing terminal. That is, registered channel information is set and stored with respect to each information processing terminal. Here, in another exemplary embodiment, the registration of a news channel may be managed with respect to each user (in other words, with respect to each account of a user). For example, the server 1 stores, in advance, registered channel information with respect to each account of a user set in the information processing terminal 2. When the information processing system newly registers a news channel in accordance with the fact that an application is started in the information processing terminal 2, the information processing system updates registered channel information regarding an account of a user for which the application is started. According to this, also when a plurality of users use a single information processing terminal, it is possible to manage the registration of a news channel with respect to each user.

(Variations Regarding Processes Performed by Server and Information Processing Terminal)

In another exemplary embodiment, a part of the process executed on the server 1 side in the above exemplary embodiment may be executed on the information processing terminal 2 side. Further, in another exemplary embodiment, a part of the process executed on the information processing terminal 2 side in the above exemplary embodiment may be executed on the server 1 side.

The exemplary embodiment can be used for, for example, an information processing apparatus such as a game apparatus or a smartphone, and an information processing system in order, for example, to provide a content corresponding to an application to be used by a user for the user.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing system comprising:
   an information processing terminal; and
   a server configured to communicate with the information processing terminal,
   the information processing terminal comprising:
     one or more processors; and
     a first transceiver,
   the one or more processors of the information processing terminal configured to:
     start an application in accordance with an instruction of a user; and
     based on the start of the application in accordance with the instruction of the user, transmit, using the first transceiver, identification information of the started application to the server,
   the server comprising:
     one or more processors;
     a memory; and
     a second transceiver,
   the memory of the server configured to store a plurality of records that each include a reference to at least one of a plurality of applications that is then linked to a reference to at least one of a plurality of different electronic data feeds for delivering electronic content in association with the corresponding at least one of the plurality of applications,
   the one or more processors of the server configured to:
     receive identification information of the started application from the information processing terminal; and
     based on the received identification information of the started application, select at least a first electronic data feed from among those data feeds included in the plurality of records that is linked to an application that corresponds to the received identification information of the started application,
   the one or more processors of the information processing terminal of the server configured to register the first electronic data feed in association with the information processing terminal,
   the one or more processors of the information processing terminal configured to:
     subsequent to registration of the first electronic data feed, receive electronic content that is delivered to the information processing terminal in accordance with the first electronic data feed being registered in association therewith.

2. The information processing system according to claim 1, wherein
   every time an application is started in the information processing terminal, the one or more processors of the information processing terminal transmit identification information of the application to the server.

3. The information processing system according to claim 1, wherein
   when an application is started multiple times in the information processing terminal, then in accordance with at least twice or more starts among the starts made multiple times, the one or more processors of the information processing terminal transmit identification information of the application to the server.

4. The information processing system according to claim 1, wherein the first electronic data feed is registered under the condition that a user gives a registration instruction.

5. The information processing system according to claim 1, wherein the one or more processors of the information processing terminal is further configured to cancel the registration of the first electronic data feed.

6. The information processing system according to claim 5, wherein under the condition that a registration of the first electronic data feed has not previously been canceled, the one or more processors of the information processing terminal or the server register the first electronic data feed.

7. The information processing system according to claim 1, wherein in a case where the information processing terminal is in a state where the information processing terminal cannot communicate with the server when the application is started, the one or more processors of the information processing terminal transmit the identification information to the server after the information processing terminal becomes able to communicate with the server.

8. The information processing system according to claim 1, wherein
   the one or more processors the server are further configured to transmit, using the first transceiver and to the information processing terminal, data that specifies that the first electronic data feed has been selected,
   the one or more processors of the information processing terminal are further configured to receive, using the second transaction, the data that specifies that the first electronic data feed has been selected, and
   the one or more processors of the information processing terminal registers the first electronic data feed based on the received data.

9. The information processing system according to claim 8, wherein
   while a started application is being executed, the one or more processors of the information processing terminal execute in a background a process of registering the first electronic data feed.

10. The information processing system according to claim 1, wherein the plurality of records include reference to a first application that is then linked to multiple different electronic data feeds,
    wherein the selected first electronic data feed is selected along with all other selected data feeds that are linked to the application that corresponds to the received identification information of the started application.

11. The information processing system according to claim 1, wherein the application is a game application.

12. The information processing system according to claim 1, wherein
the one or more processors of the information processing terminal are further configured to:
display, on a display that is coupled to the information processing terminal, a display screen that is generated based on the received electronic content.

13. An information processing apparatus configured to communicate with a server, the information processing apparatus comprising:
one or more processors; and
a transceiver,
the one or more processors of the information processing apparatus configured to:
start an application in accordance with an instruction of a user; and
transmit, using the transceiver, identification information of the started application to the server at a timing corresponding to the start of the application,
wherein the server stores a plurality of records that each include a reference to at least one of a plurality of applications that is then linked to a reference to at least one of a plurality of different electronic data feeds for delivering electronic content in association with the corresponding at least one of the plurality of applications,
wherein the server selects, based on the received identification information of the started application, at least a first electronic data feed from among those data feeds included in the plurality of records that is linked to an application that corresponds to the received identification information of the started application,
the one or more processors of the information processing apparatus configured to register the first electronic data feed in association with the information processing terminal,
the one or more processors of the information processing terminal configured to:
subsequent to registration of the first electronic data feed, receive electronic content that is delivered to the information processing terminal in accordance with the first electronic data feed being registered in association therewith.

14. A non-transitory computer-readable storage medium having stored therein an information processing program executed by a computer of an information processing apparatus configured to communicate with a server, the information processing program causing the computer to execute:
start an application in accordance with an instruction of a user; and
based on the start of the application in accordance with the instruction of the user, transmit identification information of the started application to the server,
the server configured to store a plurality of records that each include a reference to at least one of a plurality of applications that is then linked to a reference to at least one of a plurality of different electronic data feeds for delivering electronic content in association with the corresponding at least one of the plurality of applications, and based on the received identification information of the started application, select at least a first electronic data feed from among those data feeds included in the plurality of records that is linked to an application that corresponds to the received identification information of the started application,
the information processing program further causing the computer to execture registering the first electronic data feed in association with the information processing terminal,
subsequent to registration of the first electronic data feed, the information processing program further causing the computer to execute processing electronic content that is delivered to the information processing terminal in accordance with the first electronic data feed being registered in association therewith.

15. An information processing method executed by an information processing system including an information processing terminal and a server configured to communicate with the information processing terminal, the method comprising:
starting, on the information processing terminal, an application in accordance with an instruction of a user;
based on the start of the application in accordance with the instruction of the user, transmits, on the information processing terminal and using the transceiver, identification information of the started application to the server,
storing, on the server, a plurality of records that each include a reference to at least one of a plurality of applications that is then linked to a reference to at least one of a plurality of different electronic data feeds for delivering electronic content in association with the corresponding at least one of the plurality of applications;
receiving, at the server, identification information of the started application from the information processing terminal;
based on the received identification information of the started application, selecting, on the server, at least a first electronic data feed from among those data feeds included in the plurality of records that is linked to an application that corresponds to the received identification information of the started application;
registering the first electronic data feed in association with the information processing terminal; and
subsequent to registration of the first electronic data feed, receiving at the information processing terminal, electronic content that is delivered to the information processing terminal in accordance with the first electronic data feed being registered in association therewith.

* * * * *